Oct. 8, 1940.  E. ROBERTS ET AL  2,217,598
PROCESS FOR REFINING SUGAR
Filed June 11, 1938
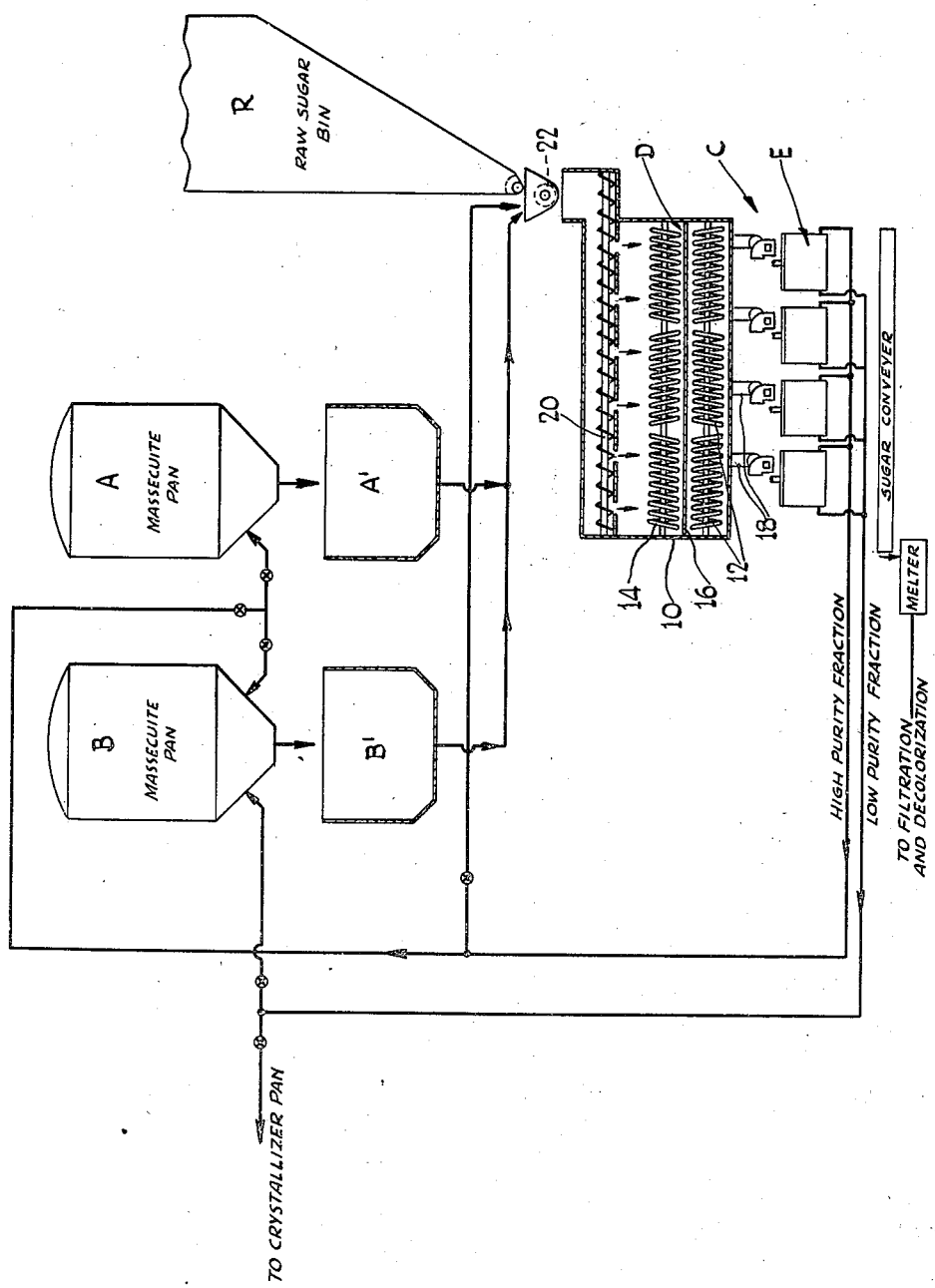
INVENTORS
EUGENE ROBERTS
GEORGE E. STEVENS
BY
ATTORNEYS Patented Oct. 8, 1940

2,217,598

UNITED STATES PATENT OFFICE 2,217,598

PROCESS FOR REFINING SUGAR

Eugene Roberts, Hastings, N. Y., and George E. Stevens, Denver, Colo., assignors to The Western States Machine Company, New York, N. Y., a corporation of Utah Application June 11, 1938, Serial No. 213,128

4 Claims. (Cl. 127—63)

This invention relates to the refining of sugar and, more particularly, to a new and improved process for use in the sugar-end operations of a sugar refinery.

In the manufacture, for example, of cane sugar according to usual practice, concentrated and partially purified juices extracted from sugar cane are boiled into massecuites from which unwashed raw sugar crystals of about 94° to 97° polarization, averaging about 96°, are obtained, and this raw sugar, at a refinery, is passed through an affination or washing stage of treatment in order to remove adherent surface impurities and to raise its purity to 98.5 or greater. In the affination treatment, a semi-fluid magma is formed consisting of raw sugar in admixture with affination syrup, and this magma is passed into centrifugal machines where the syrup is purged from the sugar crystals and the latter are washed to a purity of 98.5 or greater. The washed sugar from the centrifugals is usually dissolved, filtered and decolorized, and later boiled into white massecuite from which white sugar is produced.

Prior to the present invention, the affination process has always been a distinct stage of treatment, regardless of whether the plant using it produces refined sugar partly or wholly from cane juice (meladura), or whether it engages only in the refining of imported raw cane sugar. The known affination processes require special mingling equipment and centrifugals which are separate and distinct from the mixers and centrifugals used for the treatment of massecuites in the same plant. In addition, the requisite supply of affination syrup must be provided as a by-product of plant operations. Syrups of distinct qualities are produced both from the centrifugals which process the affination magma and from the centrifugals which process the massecuite, and these different syrups require different treatment in order to extract their available sugar content most efficiently.

An object of our invention is to provide a new and improved process for refining sugar by which the affination station, as a stage of treatment separate and distinct from other refinery operations, may be eliminated under suitable operating conditions. Another object is to provide an affination process which may be carried out without the aid of a special supply of affination syrup. A further object of the invention is to provide a process for refining sugar—which is of special value in plants where, during the cane grinding season, white sugar is produced partly from cane juice and partly from imported raw sugar,—in which the same mixing and centrifugal equipment is used both for the affination of raw sugar and for the treatment of massecuites produced in the plant. Another object is to provide a process which combines the affination of raw sugar with the curing of massecuite, thereby eliminating the need for affination syrup and eliminating production of distinct centrifugal syrups of different qualities from the raw sugar and massecuite treatments.

Still further objects and advantages of the invention will be made apparent to skilled workers in this field by the ensuing description.

In its broader aspects, our invention utilizes the discovery that the preliminary purification of grain sugar that is contaminated by adherent surface impurities, such as raw cane sugar, can be carried out to advantage by the mingling of the sugar with a massecuite produced in the normal operation of the sugar plant. In a refinery producing a part of its white sugar output from cane juice and the remainder from imported raw sugar, for example, the invention permits highly economical operations by enabling the same mingling and centrifugal equipment to be used both for the recovery of relatively pure sugar from massecuite and from the affination of raw sugar. It provides a process in which mingled massecuite and raw sugar are treated simultaneously in centrifugals to recover purged and washed sugar, of high purity, that is ready for remelting, filtering, decolorization and boiling into white massecuite. Thus a massecuite which may have been boiled to a high degree of crystallization is enhanced in crystal content, and a single treatment of the resulting magma serves all of the purposes of that which has been carried out heretofore in two separate and distinct stages of refinery operations. Furthermore, the use of massecuite as a cleansing and liquefying medium in the affination of raw sugar, in the practice of this invention, eliminates the necessity of providing special supplies of syrup, from time to time, to be used as affination syrup, and it results in the production of only one syrup or series of syrups from the centrifugals instead of the distinct syrups produced according to prior operations.

The accompanying drawing is a flow diagram illustrating a preferred manner of using our invention in a cane sugar refinery.

In the illustrated plant arrangement, vacuum pan stations A and B are indicated for the boiling of first and second, or remelt massecuites. A bin R holds raw sugar ready for affination treatment.

The vacuum pans A and B are arranged to discharge masseculites into receiving tanks A¹ and B¹, respectively. A single magma treating and purging station C is provided for the treatment of raw sugar entering the process and of masseculites produced in the A and B vacuum pans. This station includes special mixing and conditioning apparatus D, preferably of the type illustrated in the pending application of Eugene Roberts, Serial No. 83,634, filed June 5, 1936, and one or more centrifugal machines E for the treatment of successive charges of conditioned materials withdrawn from the apparatus D.

The apparatus at D comprises a U-shaped tank 10 having extensive heat-transmitting surfaces distributed substantially uniformly within and lengthwise of the same adjacent the outlets leading to the centrifugals, and means for causing relative movement between said surfaces and the material undergoing treatment, the surfaces as illustrated being provided by hollow coils 12 which are mounted for rotation and are supplied with heating fluid, at controlled temperatures, from a make-up tank (not shown). A second heating means 14, preferably of similar construction and operation, is arranged lengthwise of the tank above the first and is partly separated therefrom by baffles 16. In the operation of this apparatus, the rate at which heat is imparted to the material in the tank, for coils of given heating surface, can be controlled by varying the temperature of the heating fluid, the rate of flow of the heating fluid or the rate of rotation of the coils, so that uniformly conditioned charges of material, at a predetermined controlled temperature, may be withdrawn successively from the tank through the goosenecks 18 for immediate treatment in the centrifugals at E, for example, in accordance with the process described and claimed in U. S. Patent Re. 20,556, of George E. Stevens. Materials are fed into the top portion of the tank, substantially uniformly along its length, by means of a distributor 20, to which the materials are carried by a mingling conveyor 22. In addition, apparatus of known and suitable construction is provided for conveying, and regulating the flow of, masseculite from the receiving tanks A¹ and B¹ to the conveyor 22, for regulating the flow of raw sugar from the bin R into the conveyor 22, and for introducing a regulated amount of syrup into conveyor 22 when desired, in accordance with the flow lines shown in the drawing.

In the operation of this system, the affination of raw sugar delivered from bin R is carried out with the aid of, and simultaneously with the treatment of, masseculite from a masseculite receiving tank A¹ or B¹. The masseculite usually will be at a temperature considerably above atmospheric temperature, but somewhat lower than its final boiling temperature due to cooling in the receiving tank or during passage into the conditioning equipment. Ordinary "first" or "second" or remelt masseculites in a cane factory or refinery are suitable for the process, the purities of which may range between about 65 and about 90. Such masseculites, in order to be treated effectively in centrifugals, are usually dropped from vacuum pans after being boiled to about 90 per cent. dry substance (Brix), and they consist of from about 40 to 58 per cent. sugar crystals and saturated mother liquor. Raw cane sugar ordinarily has a dry substance of about 99 per cent. For best practical operations, to avoid non-uniformities in the syrups and sugars produced from the system and obtain sugars and run-offs of optimum purity for reprocessing, it is preferred to operate the system with masseculites having a purity of 75 or greater instead of alternately using masseculites from first and second, or high and low purity remelt, boilings.

In the practice of our process, regulated streams of masseculite from one of the vacuum pans and of raw sugar from the bin R are introduced into the conveyor 22 where they are mixed to some extent and from which they pass into the distributor 20 as a thick viscid mass that is unsuited for treatment in the centrifugal machines. The mixing of raw sugar at atmospheric temperature with the masseculite causes the resulting mass to be considerably cooler than the masseculite where the latter has not cooled completely before treatment. The raw sugar can be mixed with masseculite in various proportions so long as the per cent. dry substance of the resulting mass is not so great as to prevent a suitable semi-fluid consistency being acquired at elevated temperatures.

The mass of combined raw sugar and masseculite drops into the mingler tank 10 from the distributor, and in the mingler tank it is thoroughly stirred while dry heat is introduced from the heated surfaces of the revolving coils at 14 and 12. The input of heat is controlled in relation to the rate of withdrawal of magma through the goosenecks 18, so that, by the time the materials reach the goosenecks, their temperature has been raised to a point at which the magma possess a fluid consistency and is in condition for efficient treatment in the centrifugals at E. This temperature varies under different operating conditions but preferably will approximate or be slightly higher than the temperature at which the boiling of the masseculite has been completed, for example, about 160° to 170° F.

The thorough intermingling of masseculite and raw sugar and the simultaneous addition of large amounts of heat thereto cause the initially heavy mass, having a consistency resembling wet sand, to change into a semi-fluid magma through the liquefying action of heat on the saturated mother liquor from the masseculite. During this treatment adherent surface impurities carried by the raw sugar crystals are softened and moistened by the hot mother liquor, and the vigorous mingling of raw sugar in the highly crystalline magma causes a large proportion of these impurities to be loosened from the crystals, all without dissolving any substantial amount of the crystals. The manner in which this occurs and the operation of the mixing and conditioning apparatus are substantially the same as in the affination process described and claimed in the copending application of George E. Stevens, Serial No. 151,772, filed July 3, 1937, now United States Letters Patent No. 2,175,998.

From the mixing and conditioning apparatus D, successive charges of the conditioned magma, preferably at predetermined and uniform temperatures, are introduced into the centrifugal machines at E. Here they are purged of practically all of their mother liquor content, which is collected from the machines in a low-purity run-off fraction consisting principally of "green syrup," and they are then subjected to the action of a washing liquid in order to remove impurities which adhere to the sugar crystals despite the separating action of high centrifugal force. The washing liquid leaves the centrifugal baskets as a wash syrup of fairly high purity, containing recoverable sugar, and is preferably collected separately from the green syrup in a high purity centrifugal run-off fraction. The purities of these run-off fractions may be controlled for best process performance by appropriate control over the proportions of green and wash syrups collected together in each fraction. The apparatus and operations used at E preferably are of the types developed by Eugene Roberts and are now well known in the American sugar industry.

In this process, involving the affination of raw sugar in combination with the treatment of massecuite, the purities of the run-off fractions collected from the centrifugals may be regulated so as to be suited for passage to vacuum pans of lower purity than the pan in which the massecuite originated, for boiling into massecuites of lower purity.

The washed sugar recovered from the centrifugals, when the mixing, conditioning and centrifuging treatments are carried out according to preferred practice, attains a purity of 98.5 or greater. At this purity it is in condition for re-melting (dissolution), and passage through filters and decolorizing material to form a clear liquor that may be boiled into white massecuite for the production of white sugar.

If desired, part of the high purity run-off fraction recovered from the centrifugals may be introduced into the mingling conveyor 22, although this is not necessary in preferred embodiments of the process.

The process and arrangement of equipment herein described permit massecuites to be boiled at A or B from concentrated cane juice, or meladura, and such massecuite may then be treated simultaneously with incoming raw sugar which supplements the production from cane juice to obtain a washed, crystalline, composite product of high purity that forms the principal material, after melting and decolorization for white massecuite boilings. When the cane grinding season is over, the refinery may continue operations by the affination of imported raw sugar at the illustrated conditioning and centrifugal station, in accordance with the process described in the aforesaid United States Letters Patent No. 2,175,998 of George E. Stevens.

A refinery which grinds about 2,000 tons of sugar cane per day during the grinding season and desires to refine sufficient raw sugar to bring its daily melt of sugar for refining up to 500 tons may be mentioned as an example of the type of operations for which the present invention is particularly advantageous. Assuming a yield of sugar for refining of about 12½% on the basis of tons of cane, (as in some sugar cane areas), such a plant will need to treat about 250 tons of imported raw sugar of 96° polarization per day to bring its daily melt up to 500 tons. From 2,000 tons of cane about 10,000 cu. ft. of "first" or A, massecuite of about 90 per cent. dry substance, will be produced. Assuming 1,000 cu. ft., or 46.25 tons at 90 per cent. dry substance, of massecuite per pan boiling, the requisite daily melt is maintained by combining and treating the massecuite from each pan with about 25 tons of raw sugar (99 per cent. dry substance). This produces a magma of about 93 per cent. dry substance, which may be mingled and heated to about 170° F. in the conditioning apparatus and then purged and washed efficiently in the centrifugal machines. Thus about 500 tons per day of washed sugar of high purity may be produced for refining without requiring separate purging of massecuites and affination of incoming raw sugar, and without requiring the separate equipment and special supplies of affination syrup which have been used heretofore wherever raw sugar is refined.

While, for purposes of illustration, we have described particular methods of using our invention, we recognize that it may be applied in other ways and without limitation to any particular conditions or details of operation. We therefore intend that the appended claims be accorded a scope commensurate with the novel contributions of the invention as interpreted in the spirit of the disclosure and without restriction to non-essential details.

We claim:

1. The process of refining sugar which comprises combining massecuite with granular sugar having adherent surface impurities, heating the combined materials so as to impart a fluidity suitable for efficient separation of solids from liquid, and thereafter separating grain sugar from the liquid content of the combined materials.

2. The process of refining sugar which comprises combining massecuite with granular sugar having adherent surface impurities, heating the combined materials so as to impart a fluidity suitable for purging, and then purging them in centrifugal machines.

3. In the processing of sugar, the steps which comprise boiling a massecuite, mingling the massecuite with raw sugar, heating the mingled mass so as to impart a fluidity suitable for centrifuging, and then separating its liquid and solid constituents and washing the latter in centrifugal machines.

4. In the production of white cane sugar, the steps which comprise boiling massecuite from process materials and concentrated cane juice, mingling such massecuite with raw cane sugar, stirring and heating the combined materials to increase their temperature and fluidity and to loosen adherent impurities from the raw sugar, and thereafter separating liquid and solid constituents of the resulting magma in centrifugal machines.

EUGENE ROBERTS.
GEORGE E. STEVENS.